Aug. 24, 1954 A. C. KRACKLAUER 2,687,217
HORIZONTAL PLATE FILTER
Filed Dec. 21, 1951
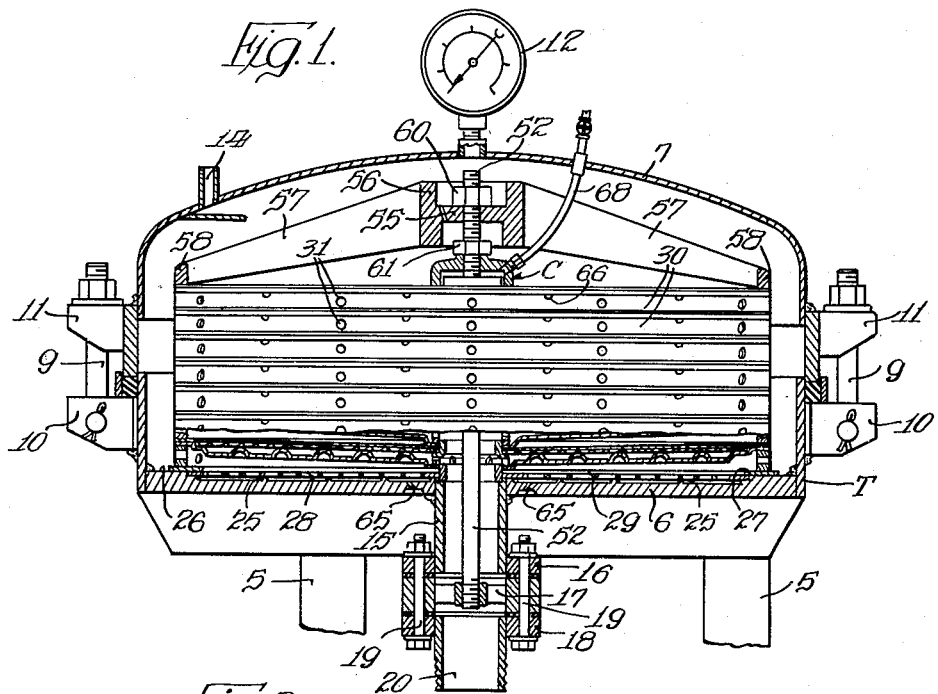
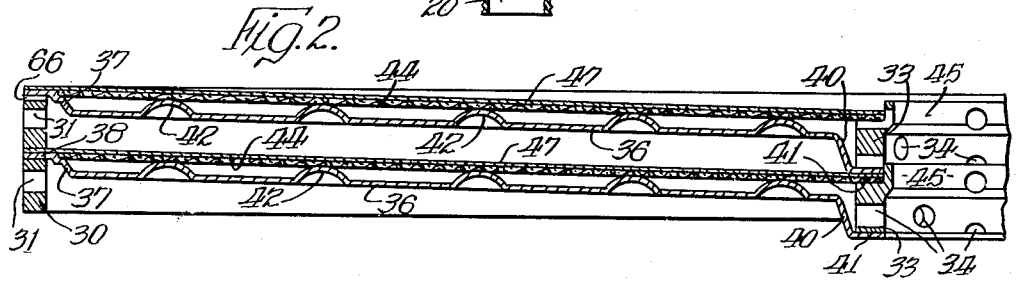
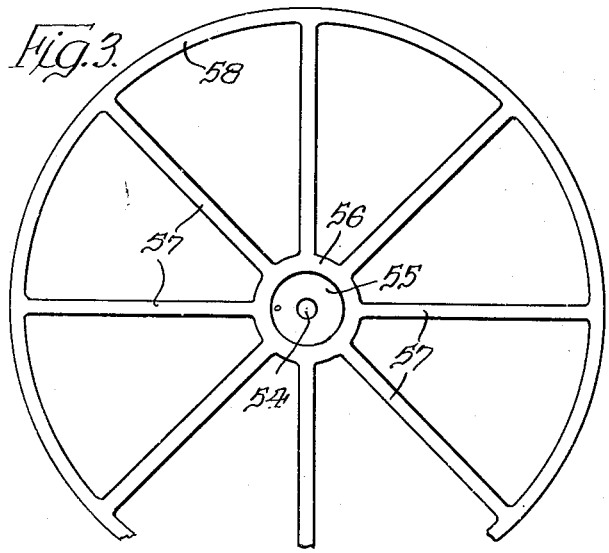
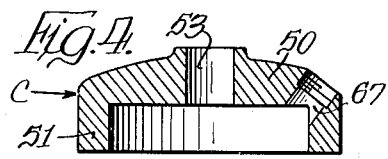
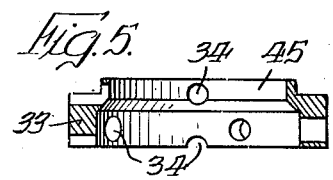
INVENTOR.
Aloysius C. Kracklauer
BY
Banning & Banning
Attys.

Patented Aug. 24, 1954

2,687,217

UNITED STATES PATENT OFFICE 2,687,217

HORIZONTAL PLATE FILTER

Aloysius C. Kracklauer, Mundelein, Ill.

Application December 21, 1951, Serial No. 262,786

5 Claims. (Cl. 210—185)

This invention relates to a filter of the type in which a plurality of horizontal filter units are assembled into a tier within a cylindrical tank, with provision for liquid to circulate through the filtering media of each unit and into a central column for gravity outflow therethrough. The present filter is designed primarily for industrial use, and is effective for the clarification of various liquids and for the separation of solid particles contained in liquid vehicles which may be of many different kinds—acids, oil, syrups, wines, and varnish, being examples.

The features of improvement which characterize the present filter are concerned primarily with a simplified means for applying balanced axial forces to a column of compression rings adjacent the outer margins of the filter units and to a second column of inner compression rings which are located adjacent the inner margins thereof. Successful operation of a filter apparatus employing horizontal filter units of the kind in question requires that a substantial degree of compression be maintained between the filter units adjacent their outer margins and also their inner margins to prevent leakage at these points. While the amount of this compression may perchance be the same at both the inner and outer margins of the filter units, there is no assurance that this will be so.

According to the mechanism of this invention, it is possible to predetermine the relative amount of compression at these two columnar points so as to meet any special condition that may arise. It occasionally happens that there is a slight variation in the total thickness of the filter units either adjacent the outer or inner margins thereof, and without some provision for independent application of a clamping pressure at these points, a positive seal cannot be attained. The present invention provides means for adequately meeting such a condition.

This and other objectives of my invention, as will hereinafter appear, may be realized from a filter construction of which a suggestive embodiment is illustrated in the accompanying drawing wherein—

Figure 1 is a central vertical section taken through the filter apparatus in its entirety;

Fig. 2 is an enlarged fragmentary detail through two of the filter units when arranged operatively with respect to each other;

Fig. 3 is a top plan view of the truss structure which surmounts the tier of filter units to apply a controlled pressure to the outer column of compression rings thereto; and Figs. 4 and 5 are vertical sectional views through the cap and one of the inner compression rings that is comprised in the tier of filter units.

In the illustrated filter apparatus, there is a cylindrical tank T suitably supported on legs 5 whereby its bottom 6 is sustained at a desired elevation. A removable dome top 7 which provides a closure for the tank is shown as secured in place by bolts 9 pivoted to lugs 10 which are affixed to the tank sides for engagement with yokes 11 that outstand from the top. A pressure registering gauge 12 is mounted on the top, as shown, and also an inlet 14. Such a construction is common at the present time and needs no further description.

For draining the filtered liquid from the tank a discharge opening is provided at the base of an axial column 15 which is anchored to the bottom 6 and extended downwardly therethrough to carry at its lower end a fixed ring 16. Below this ring and coaxial therewith is a spider 17 and therebelow a second ring 18 through which pass bolts 19 for securing the two rings 16 and 18 and spider 17 in unitary relation. Depending from the lower ring 18 is a drain outlet 20 so that liquid descending through the column 15 and through the spider will pass out through the outlet 20.

The construction thus far described is concerned with the tank, its top, and its inlet and its outlet. There remains to be considered the filter apparatus which operates within such a tank. As herein shown the tank bottom 6 is provided with a plurality of upstanding circular ribs 25 arranged concentrically of its axis, and also with a marginal platform 26 of slightly higher elevation. An inside step 27 of the same height as the ribs 25 provides therewith a plurality of spaced circular supports for a lower base plate 28 upon which is positioned an upper base plate 29 whose outer marginal portion is rested on the platform 26. Both base plates are centrally apertured, as are all the plates hereinafter noted, and which are assembled and arranged in the manner now to be described in the form of a tier.

Referring now to Fig. 2, each filter unit comprises an outer compression ring 30 having a plurality of radial ports 31 formed therethrough, an inner compression ring 33 also formed with a plurality of radial ports 34 therethrough, a lower circular plate 36 having an upwardly extending outer marginal wall 37 from which is outwardly extended a flange 38, the plate near its inner margin being downturned at 40 and then flanged inwardly at 41, and being provided with means, such as upwardly protruded bosses 42, in supporting engagement with the under face of an overlying foraminous disc 44 whose outer periphery is accommodated in a seat that is formed adjacent the outturned flange 38 of the lower plate 36. A sheet 47 of filtering material is laid over the supporting disc 44 to extend continuously between its inner and outer margins. Through the central aperture of each filtering sheet 47 and disc 44 is extended a collar 45 which upstands from the associated inner compression ring 33 in inset relation thereto a sufficient distance to engage the inner flange 41 and inner compression ring 33 of the next higher filter unit, thereby to maintain verticality in the tier of filter units which are thus arranged one upon the other. The superposed inner and outer compression rings 33 and 30 produce what will be referred to as tubular columns which are coaxial and concentric.

It will be manifest that liquid within the tank T is free to flow through the radial ports 31 of the outer compression ring 30 to enter the space between adjacent filter units thereby to cover each filtering sheet 47 through which the liquid then passes. The liquid thus filtered passes through each foraminous disc 44 and then flows inwardly and through the ports 34 of each inner compression ring 33 so as to enter the central vertical column where it descends by gravity to and through the drain outlet 20 for discharge from the tank. It will be noted that the several plates and discs of the filter units are inclined slightly downwardly toward the center so that the flow of liquid inwardly will be gravity-assisted.

Above the filtering sheet 47 of the topmost filter unit is a cap C to provide a top closure for the central column. This cap is formed with a dome top 50 from which depends a circular depending marginal wall 51 whose bottom end is rested upon the filtering sheet 47 of the topmost filter unit adjacent its inner margin. A tie bolt 52 which is anchored near its lower end in a tapped hole in the spider 17 extends axially upwardly through the column, through a hole 53 in the dome of the cap, and through a hole 54 in a wall 55 arranged crosswise of a hub 56 from which arms 57 are extended radially outwardly and slightly downwardly to join at their extremities with a head ring 58 which is substantially of the same diameter as the several compression rings 30 and in concentric relation therewith. The structure thus provided is in effect a truss and capable of transmitting through its head ring 58 a downward pressure whenever a similarly directed force is exerted upon the hub 56, as by rotatively advancing upon the bolt 52 a nut 60 which engages with the top face of the cross wall 55. A lower nut 61 also threaded upon this bolt is adapted to bear with pressure upon the top face of the cap drum 50. A rotative downward advance of the upper nut 60 transmits a downward force to the head ring 58 and thence to the compression rings 30 therebelow; likewise a rotative advance of the lower nut 61 will transmit to the cap wall 51 a downward force which then subjects the inner rings 33 therebelow to a compressive action. These forces which are applied at points adjacent the inner and outer margins of the filter units are resisted by the lowermost filter unit which is rested upon the base plate 29 at the tank bottom and supported thereon at points adjacent the inner and outer margins of the tier of filter units, i. e., in line with the forces of compression that are downwardly directed from the top. The tie rod 52 which is anchored near its lower end to the spider is subjected to a tension force in these operations, but the arrangement is such that the pressures exerted at every point circularly of the inner compression rings 33 is uniform as is also the similar force that is exerted on the outer compression rings 30. Because the tie rod is disposed at the exact center of the circular truss, a perfect balance in the applied forces is also achieved.

It is an important feature of this invention that provision is made for separate adjustments in the compressive forces that are applied to the tubular columns that are built up by the superposed inner and outer set of rings. It sometimes happens that the build-up of the filter units is not the same at their inner and outer margins. In such circumstances the axial position of the closure cap C should be varied relative to the truss structure to produce in the pressures applied vertically to the inner and outer compression rings the differential that is requisite for maintaining effective seals between them. The structure of this invention, through the medium of the axial tie rod and the means described, is such that pressure in a selected degree may be applied at both inner and outer marginal points of the filter units.

As shown in Fig. 1, the tank bottom 6 is provided near its center with certain scavenger outlets 65 through which liquid may be drained from the tank at the conclusion of a filtering operation. The ports 34 in the inner compression rings are disposed at varying elevations, some high up and others in the form of half-circle slots at the bottom face of the ring. By such an arrangement the performance of the filter is improved when a gaseous liquid, such as beer, is being filtered. The liquid will flow readily inwardly into the tubular column at the center through the half-circle ports at the bottom of the rings 33, while gas which is freed from the body of the liquid may readily move outwardly again through the upper ports 34 and advance radially outwardly along the under side of the plates 36 to escape from within the filter units through channels 66 which extend crosswise of the upper face of each outer compression ring 30. The gas so liberated into the body of liquid may ascend therefrom for escape from the tank through any suitable vent. Any gas which ascends within the tubular column defined by the inner compression rings 33 is free to pass out through a tapped hole 67 which is provided in the cap C to which is connected a conduit 68 which extends through the tank top 7 to release the gas to the atmosphere.

I claim:

1. In a horizontal plate filter of the type wherein is arranged a tier of firmly based filter units each comprising a plate-supporting filtering sheet on whose upper face is rested the bottom faces of inner and outer compression rings disposed concentrically about a vertical axis and collectively defining spaced inner and outer tubular columns, the feature of improvement which comprises a cap surmounting the inner column and in engagement with the top face of the filtering sheet of the topmost filter unit through an annular area substantially concentric with the horizontal faces of the inner compression rings therebelow, the cap being formed with a hole extending axially therethrough, a tie rod extending axially within the column through the hole in the cap and upwardly therebeyond and having a fixed anchorage near its lower end at a point below the column, a head ring in engagement with the top face of the filtering sheet of the topmost filter unit through an annular area substantially concentric with the horizontal faces of the outer compression rings therebelow, a hub above the cap in spaced relation thereto and having an axial opening through which the bolt is extended, a plurality of arms rigidly interconnecting the hub and head ring to provide a truss structure, and nuts threaded on the bolt one above the cap for engagement with the top face thereof and the other above the hub for engagement with the top face thereof, the arrangement being such that separate rotative advance of the nuts downwardly upon the bolt will exert downwardly directed forces, each independent of the other, upon the columns of inner and outer compression rings, and reactively of an upwardly directed tension force upon the bolt axially of the two columns of rings whereby to maintain thereon a selected pressure that is uniform at all points circumferentially thereof.

2. In a horizontal plate filter of the type wherein is arranged a tier of firmly based filter units each comprising a plate-supported filtering sheet on whose upper face is rested the bottom faces of inner and outer compression rings disposed concentrically about a vertical axis and collectively defining spaced inner and outer tubular columns, the feature of improvement which comprises a cap surmounting the inner column and in engagement with the top face of the filtering sheet of the topmost filter unit through an annular area substantially concentric with the horizontal faces of the inner compression rings therebelow, the cap being formed with a hole extending axially therethrough, a tie rod extending axially within the column through the hole in the cap and upwardly therebeyond and having a fixed anchorage near its lower end at a point below the column, a head ring in engagement with the top face of the filtering sheet of the topmost filter unit through an annular area substantially concentric with the horizontal faces of the outer compression rings therebelow, a hub above the cap in spaced relation thereto and having an axial opening through which the bolt is extended, a plurality of arms rigidly interconnecting the hub and head ring to provide a truss structure, and separate screw means coacting with the bolt at spaced points thereon, one in axial motion-transmitting connection with the cap and the other in axial motion-transmitting connection with the hub, the arrangement being such that separate rotative advance of the screw means downwardly upon the bolt will exert downwardly directed forces, each independent of the other, upon the columns of inner and outer compression rings, and reactively of an upwardly directed tension force upon the bolt axially of the two columns of rings whereby to maintain thereon a selected pressure that is uniform at all points circumferentially thereof.

3. In a horizontal plate filter of the type wherein is arranged a tier of firmly based filter units each comprising a plate-supported filtering sheet on whose upper face is rested the bottom faces of inner and outer compression rings disposed concentrically about a vertical axis and collectively defining spaced inner and outer tubular columns, the feature of improvement which comprises a cap surmounting the inner column and in engagement with the top face of the filtering sheet of the topmost filter unit through an annular area substantially concentric with the horizontal faces of the inner compression rings therebelow, the cap being formed with a hole extending axially therethrough, a tie rod extending axially within the column through the hole in the cap and upwardly therebeyond and anchored near its lower end at a point below the lowermost filter unit, a head ring in engagement with the top face of the filtering sheet of the topmost filter unit through an annular area substantially concentric with the horizontal faces of the outer compression rings therebelow, a hub above the cap in spaced relation thereto and having an axial opening through which the bolt is extended, means rigidly interconnecting the hub and head ring to provide a truss structure, and independently operable adjusting means carried by the bolt at spaced points thereon, one in axial motion-transmitting connection with the cap and the other in axial motion-transmitting connection with the hub, the arrangement being such that operation of the two adjusting means will exert downwardly directed forces, each independently of the other, upon the columns of inner and outer compression rings, and reactively of an upwardly directed tension force upon the bolt axially of the two columns of rings whereby to maintain thereon a selected pressure that is uniform at all points circumferentially thereof.

4. In a horizontal plate filter of the type wherein is arranged a tier of firmly based filter units each comprising a plate-supported filtering sheet on whose upper face is rested the bottom faces of inner and outer compression rings disposed concentrically about a vertical axis and collectively defining spaced inner and outer tubular columns, the feature of improvement which comprises a closure surmounting the inner column and having means in engagement with the top face of the filtering sheet of the topmost filter unit through an annular area substantially concentric with the horizontal faces of the inner compression rings therebelow, the closure being formed with a hole extending axially therethrough, a tie rod extending axially within the column through the hole in the closure and upwardly therebeyond and anchored near its lower end at a point below the lowermost filter unit, a head ring in engagement with the top face of the filtering sheet of the topmost filter unit through an annular area substantially concentric with the horizontal faces of the outer compression rings therebelow, a hub above the closure in spaced relation thereto and having an axial opening through which the bolt is extended, means rigidly interconnecting the hub and head ring to provide a truss structure, independently operable adjusting means carried by the bolt at spaced points thereon, one in axial motion-transmitting connection with the closure and the other in axial motion-transmitting connection with the hub, the arrangement being such that operation of the two adjusting means will exert downwardly directed forces, each independently of the other, upon the columns of inner and outer compression rings, and reactively of an upwardly directed tension force upon the bolt axially of the two columns of rings whereby to maintain thereon a selected pressure that is uniform at all points circumferentially thereof, a tank having an inlet and an outlet and enclosing the tier of filter units to provide a sealed housing therefor, and a flexible conduit extending between the closure through a wall of the tank for release to the atmosphere of gas contained within the inner column of the tier of filter units.

5. A horizontal plate filter comprising: a single filter unit having a plate covered by filtering material in sheet form; an outer compression ring disposed below the outer peripheral margin of said plate; an inner compression ring supporting said filtering material; a base plate supporting said inner and outer compression rings; and dual compression means adapted to exert separate and uniform pressures circumferentially upon the inner and outer compression rings, said compression means including a top closure surrounding the inner compression ring and engaging the inner marginal portions of said filtering material, said top closure being formed with a hole extending axially therethrough, a tie rod extending axially through said hole in the closure, said tie rod being anchored below the filter unit, a head ring on the top face of the filtering material in opposed relation with the outer compression ring, a hub above the top closure in spaced relation thereto and having an axial opening through which the tie rod is extended, a plurality of arms interconnecting the hub and head ring to provide a truss structure, and separate screw means coacting with the tie rod at spaced points thereon to maintain uniform pressure upon the inner and outer compression rings.

References Cited in the file of this patent

UNITED STATES PATENTS

| Number | Name | Date |
|---|---|---|
| 1,670,319 | Sweetland | May 22, 1928 |
| 1,794,281 | Dorfner | Feb. 24, 1931 |
| 1,930,209 | Milkey | Oct. 10, 1933 |
| 1,931,000 | Govers | Oct. 17, 1933 |
| 2,278,453 | Kracklauer | Apr. 7, 1942 |
| 2,328,891 | Cline | Sept. 7, 1943 |
| 2,602,548 | Griffiths | July 8, 1952 |
| 2,624,465 | Kracklauer | Jan. 6, 1953 |

FOREIGN PATENTS

| Number | Country | Date |
|---|---|---|
| 2,931 | Great Britain | of 1897 |
| 646,230 | France | July 10, 1928 |
| 860,966 | France | Jan. 29, 1941 |